United States Patent [19]

Strauss et al.

[11] 4,098,621

[45] Jul. 4, 1978

[54] SOLDERING FLUXES

[75] Inventors: Rudolf Siegfried Strauss; Peter David Teitz, both of London, England

[73] Assignee: Fry's Metals Limited, England

[21] Appl. No.: 795,011

[22] Filed: May 9, 1977

[30] Foreign Application Priority Data

May 27, 1976 [GB] United Kingdom ............... 22100/76

[51] Int. Cl.$^2$ ............................................. B23K 35/34
[52] U.S. Cl. ......................................... 148/23; 148/24
[58] Field of Search .................................... 148/23, 24

[56] References Cited

U.S. PATENT DOCUMENTS

| | | | |
|---|---|---|---|
| 2,880,126 | 3/1959 | Jordan | 148/23 |
| 2,978,369 | 4/1961 | Battle | 148/23 |
| 2,981,648 | 4/1961 | Peterson | 148/23 |
| 2,992,949 | 7/1961 | Melchiors | 148/23 |
| 3,000,769 | 9/1961 | Melchiors | 148/23 |
| 3,748,191 | 7/1973 | Strauss | 148/23 |
| 3,840,411 | 10/1974 | Rozzi | 148/23 |
| 3,912,550 | 10/1975 | Bolte | 148/23 |
| 3,960,613 | 6/1976 | Stayner | 148/23 |

*Primary Examiner*—P. D. Rosenberg
*Attorney, Agent, or Firm*—Watson, Cole, Grindle & Watson

[57] ABSTRACT

A soldering flux which comprises an aqueous solution containing a mixture of 25 – 75% by weight of a hydrobromide of an aliphatic hydroxyamine and 75 – 25% by weight of a hydrobromide of an aliphatic amine.

3 Claims, No Drawings

SOLDERING FLUXES

A soldering flux, described in British Specification No. 1,208,145 and primarily intended for applications such as soldering heat exchanger assemblies, consists of an aqueous solution of a hydrobromide of a monobasic amino acid, for example beta alanine hydrobromide, which contains a substituted ammonium bromide, such for example as ethylamine hydrobromide.

This flux has given excellent results when used for soldering assemblies made to a high standard of precision, the flux having a sufficiently long high temperature life in the oven in which soldering is effected and adequate flow to ensure that leakages in the soldered joints are kept to a minimum.

The present invention aims to provide a soldering flux having a longer high temperature life, which can be effectively used for soldering assemblies manufactured to a lower standard of precision, which will not leave any significant amount of corrosive residue and which provides no hazard to health so that it may be used as a replacement for fluxes based on hydrazine hydrobromide, which has fallen from favour owing to its toxic nature.

The flux according to the invention comprises an aqueous solution containing a mixture of 25–75% by weight of a hydrobromide of an aliphatic hydroxyamine and 75–25% by weight of a hydrobromide of an aliphatic amine.

Examples of suitable aliphatic hyroxyamines are ethanolamine, diethanolamine, triethanolamine, propanolamine, isopropanolamine and butanolamine, diethanolamine being preferred. Examples of suitable aliphatic amines are methylamine, ethylamine, ethylene diamine, isopropylamine and butylamine, ethylamine being preferred. Preferably the solution contains equal amounts by weight of the hydrobromides of the two classes of amine.

The hydrobromide of the aliphatic hydroxyamine, typically diethanolamine hydrobromide, has a long high temperature life, e.g. of 50 seconds, as compared with 2 seconds when tested under the same conditions in comparison with beta alanine hydrobromide, but has very little tendency to promote solder flow and therefore a low fluxing efficiency. The hydrobromide of the aliphatic amine, typically ethylamine hydrobromide, on the other hand has a very high fluxing efficiency but a short high temperature life. An aqueous flux containing both ingredients is not only able to promote the ready flow of solder into the joints in assemblies to be soldered but remains active, owing to the presence of the diethanolamine hydrobromide or other hydrobromide of an aliphatic hydroxyamine, for a relatively long period in the oven.

Preferably the flux contains a small proportion of a wetting agent. This is desirable to prevent spitting of the flux. A preferred wetting agent is the nonionic wetting agent (an alkoxylated fatty alcohol) supplied as Texofor V 27 by ABM Chemicals.

The following are examples of fluxes according to the invention:

I

Diethanolamine hydrobromide:10 g
Ethylamine hydrobromide:10 g
Wetting agent:1 g
Water to make up to:100 cc

II

Ethylene diamine hydrobromide:10 g
Diethanolamine hydrobromide:10 g
Wetting agent:1 g
Water to make up to:100 cc

III

Ethylene diamine hydrobromide:10 g
Monoethanolamine hydrobromide:10 g
Wetting agent:1 g
Water to make up to:100 cc

IV

Ethylamine hydrobromide:10 g
Monoethanolamine hydrobromide:10 g
Wetting agent:1 g
Water to make up to:100 cc

V

As IV but ethylamine hydrobromide 5 g and monoethanolamine hydrobromide 15 g.

VI

As IV but ethylamine hydrobromide 15 g and monoethanolamine hydrobromide 5 g.

VII

Ethylene diamine hydrobromide:10 g
Triethanolamine hydrobromide:10 g
Wetting agent:1 g
Water to make up to:100 cc

VIII

As VII but ethylene diamine hydrobromide 5 g and diethanolamine hydrobromide 15 g.

IX

As VII but ethylene diamine hydrobromide 15 g and diethanolamine hydrobromide 5 g.

The above are flux concentrates, which may be used as such in difficult environments but will normally be diluted by the user by up to 10 times their volume of water according to conditions of use.

All of the fluxes described in the foregoing examples have a long high temperature life and sufficient fluxing efficiency to make them useful fluxes. Optimum performance is obtained from the flux of example I.

This preferred flux is normally made up in situ by addition of hydrobromic acid to a mixture of diethanolamine and ethylamine, both as available commercially and the appropriate volume of water. The solution preferably contains free hydrobromic acid to enable it to remove surface oxide from the metal surface to which the flux is applied.

It is not essential to use pure water as the solvent. Thus the water may be replaced by up to 75% by volume of an alcohol, e.g. isopropyl alcohol or industrial methylated spirits. The flux according to the invention may also contain other additives, such for example as polyethylene glycol or glycerol.

The flux according to the invention leaves a residue which is water soluble and requires a minimum of washing to remove it.

What we claim as our invention and desire to secure by Letters Patent is:

1. A soldering flux which comprises an aqueous solution containing a mixture of 25–75% by weight of diethanolamine hydrobromide and 75–25% by weight of ethylamine hydrobromide.
2. A flux according to claim 1, which contains equal amounts by weight of said hydrobromides.
3. A flux according to claim 1, which contains free hydrobromic acid.